March 15, 1927.  
C. A. McCAIN  
1,621,263  
RECIPROCATING MECHANISM  
Original Filed May 23, 1924  5 Sheets-Sheet 1

Fig. 1.

INVENTOR.
Cyrus A. McCain
BY Thomas H. Ferguson
ATTORNEY.

March 15, 1927.   1,621,263
C. A. McCAIN
RECIPROCATING MECHANISM
Original Filed May 23, 1924   5 Sheets-Sheet 2

INVENTOR.
Cyrus A. McCain
BY Thomas H. Ferguson
ATTORNEY.

March 15, 1927.  
C. A. McCAIN  
RECIPROCATING MECHANISM  
1,621,263  
Original Filed May 23, 1924  5 Sheets-Sheet 3

INVENTOR.  
Cyrus A. McCain  
BY Thomas H. Ferguson  
ATTORNEY

March 15, 1927.

C. A. McCAIN

1,621,263

RECIPROCATING MECHANISM

Original Filed May 23, 1924    5 Sheets-Sheet 4

INVENTOR.
Cyrus A. McCain
BY Thomas H. Ferguson
ATTORNEY

March 15, 1927.     C. A. McCAIN     1,621,263
RECIPROCATING MECHANISM
Original Filed May 23, 1924     5 Sheets-Sheet 5

INVENTOR.
Cyrus A. McCain
BY Thomas H. Ferguson
ATTORNEY.

Patented Mar. 15, 1927.

1,621,263

UNITED STATES PATENT OFFICE.

CYRUS A. McCAIN, OF OAK PARK, ILLINOIS.

RECIPROCATING MECHANISM.

Application filed May 23, 1924, Serial No. 715,286. Renewed August 4, 1926.

In certain classes of machines, such as printing presses of the reciprocating bed type, large masses have to be moved at considerable speed and then retarded, stopped and oppositely accelerated at each end of the reciprocating movement in a relatively short distance.

In my prior Patent No. 1,063,273, granted June 3, 1913, I have disclosed and claimed novel mechanism for producing such reciprocating movements in machines of the class mentioned. The present invention is an improvement of the mechanism of said patent. Although the invention is capable of use outside of the printing press art, I have chosen to illustrate the same in that connection.

The principal object of the invention is to provide novel mechanism of the class mentioned which shall be simple in constructon and yet durable and efficient in use and economical to manufacture.

To this end I have provided a new arrangement of gearing for driving the main reciprocating member through the mid-portions of its to and fro movements. In the preferred embodiment, aligned racks on the main reciprocating member are engaged by gear segments on intermeshing driving wheels at the proper times to bring about the respective mid-portion drivings. These wheels preferably make but one revolution for each cycle of operations of the reciprocating member.

Another feature of the invention resides in novel mechanism for connecting the main reciprocating member to an auxiliary member which controls the reversals of the main member. In its preferred embodiment the auxiliary member is a central pin on a link connecting the driving wheels and has a reciprocating movement approximately parallel to, and of the same length as that of the main reciprocating member. The novel connecting mechanism loosely connects the two reciprocating members together during the mid-portions of their reciprocations and firmly connects them together against relative longitudinal movement as said members approach the ends of their reciprocations and pass through their reversals.

The various features and advantages of the invention will be more fully understood upon reference to the following detailed description, taken in connection with the accompanying drawings, and the scope of the invention will be particularly pointed out in the appended claims.

In said drawings.

Referring to the drawings in detail, 20 designates the base frame of the press. The same is preferably one casting and comprises the side members 21 and 22, the end members 23 and 24, a transverse central member 25, the corner standards 26, 27, 28 and 29, and the intermediate standards 30, 31, 32 and 33. Upon the upper ends of the outer standards just enumerated, a second frame 34 is located. This frame includes the side members 35 and 36 and the end members 37 and 38. Additional frames at the feeding end of the press rest upon the frame 34. These are two in number and comprise in the one instance the horizontal member 40 and the upright 43 and in the other instance the horizontal member 41 and the upright 44. A feeder frame 45 is also secured to the uprights 43 and 44. The latter comprises the end frames 46 and 47, but need not be particularly described herein, as the feeder constitutes the subject matter of another application, Serial No. 723,196, filed June 30, 1924. These various frames may be secured together in any desired way. Preferably, machine screws pass through openings in flanges upon one member into threaded engagement with tapped openings in the other member. These connections are illustrated in the case of frames 20 and 34 by the flanges 48 and 49 on side members 35 and 36 respectively of the frame 34, cooperating with machined ends of the uprights 26, 27 and 30 on the one side and of the uprights 28, 29 and 31 on the other side of the frame 20, and the same are secured together respectively by screw bolts 54 and 56. These instances will suffice to illustrate the manner of connecting the frames together, and the other several connections need not be particularly pointed out.

Guide ways 57 and 58 extend from end to end of the press between the end members 37 and 38 of the intermediate or "way" frame 34, and contain the usual slider rolls 59 and 60 upon which the bed 61 is adapted to travel in its to and fro movements under the impression cylinder 62. The latter is journaled in boxes 63 and 64 movably mounted near the upper ends of the uprights 65 and 66 which form extensions of the frame 34. As in the case of the other frames, these uprights may be secured to the frame 34 in any desired way. Preferably, however, connection is made by means of screws 67 and 68 which pass through the lower ends of the uprights into threaded engagement with tapped openings in the side members 35 and 36 of the frame 34. A feed board 69 is also mounted upon the uprights 43 and 44 of the upper frame 39. As the bed 61 moves to and fro, the paper is fed from the feeder upon the feeder frame 45 over the feed board 69 to the cylinder 62, the impression is made by the type upon the bed 61, and the printed sheet is delivered from the machine. The general arrangement of the machine is the same as that of my prior Patent No. 1,063,273.

Motion is transmitted to the several parts of the machine through the main driving shaft 71 journaled at one end in a bearing formed in the upright 31 of the base frame 20, and at its other end in a bearing formed at the upper end of a bracket frame 72 secured at its base to the same upright 31. The driving shaft 71 has a driving pulley 73 keyed to it at its outer end, and at its inner end it is provided with a pinion 74.

The latter meshes with a gear wheel 75 of much larger diameter, mounted upon a shaft 76 journaled at one end in a bearing formed in the upright 31, and at its other end in a bearing formed in the lateral extension 73 of the upright 33. The gear wheel 75 meshes with a gear wheel 79 which, in turn, meshes with the gear wheel 80 upon the impression cylinder 62. The gear wheel 79 is mounted on a stud shaft extending inwardly from the adjacent upright 66. On the opposite side of the driving shaft 71 is a shaft 81 mounted at one end in a bearing formed in the upright 31, and at its other end in a bearing formed in the extension 83 of the intermediate upright 33. The inner ends of the shafts 76 and 81 carry the intermeshing driving wheels 84 and 85 respectively. As clearly shown, these wheels are provided throughout their peripheries with gear teeth which intermesh. The wheel 84 being keyed to the shaft 76, rotates with it and, in turn, drives the wheel 85 upon the shaft 81. The wheels 84 and 85 are provided with toothed segments 86 and 87 respectively. The under side of the bed 61 is provided with two aligned toothed racks 88 and 88'. It will be noted that these racks are in the plane of the segments 86 and 87. It is the teeth of these segments that engage the teeth of the racks 88 and 88', and drive the bed 61 through the mid-portions of its reciprocating movements, the teeth of segment 87 always cooperating with the teeth of rack 88, and the teeth of segment 86 always cooperating with the teeth of rack 88', the former to drive the bed in one direction, and the latter to drive the bed in the opposite direction. It will also be noted that the teeth upon the wheels 84 and 85 which intermesh and are relied upon in driving wheel 85 by wheel 84, do not come in the plane of the racks 88 and 88' and, consequently, do not drive the bed.

As just noted, the segments 86 and 87 upon the driving wheels 84 and 85 are employed to drive the bed 61 through the central portions of its reciprocations, but as the bed approaches the end of its to and fro movements these segments pass out of engagement with the rack upon the bed and, consequently, further motion of the bed must be produced by other means. This means is provided in part by the link 89 which is provided with a central stud 90 which travels to and fro through a path which is approximately parallel to the path of travel of the bed 61, and which is also equal in extent to the travel of the bed. When either gear segment 87 passes out of engagement with the rack 88, or gear 86 passes out of engagement with the rack 88', the further movement of the bed 61 is placed under the control of the stud 90, and through its action the bed is retarded, stopped and oppositely accelerated up to a speed corresponding to the peripheral speed of the wheels 84 and 85. When this speed is reached the proper segment 86, or 87, is brought into mesh with its rack 88', or 88, to continue the movement of the bed at a uniform speed until the opposite end of the movement is reached. When this is reached the control of the movement of the bed is again shifted to the link 89 and its stud 90 to cause retardation, stopping and opposite acceleration. In this way the gear segments 86 and 87 are alternately brought into mesh with their respective racks to drive the bed at a uniform speed, and the retarding, stopping and accelerating at the ends of the bed's motion are accomplished by the link 89 and its stud 90. This link is provided with slots 91 and 92 through which crank pins 93 and 94 upon the wheels 84 and 85 extend. The link 89 may be held upon the pins 93 and 94 in any suitable way. However, this is preferably done by capping discs 95 and 96 secured by screws 97 and 98 screwed into the ends of the pins 93 and 94 respectively. These caps and screws which hold the link 89 in position and allow it to move freely upon the pins are both shown in Fig. 2, and one set in detail in Figs. 3, 4 and 9, but omitted from the other figures of the drawing for the sake of clearness. The ends of the link 89 are provided with shoulder pieces 99 and 100 which cooperate with the arcuate projections 101 and 102 to prevent the link from sliding upon the pins 93 and 94 during certain positions of the parts. Pins 103 and 104 upon the link 89, and not far from the central stud 90, cooperate with arcuate members 105, 106 and 105', 106' for the same purpose. With the arrangement illustrated the stud 90 upon the link 89 travels in a direction approximately parallel to the direction of motion of the bed 61, as before noted.

Connection is established between the stud 90 and the bed 61 so as to bring about its reversals at the ends of its reciprocating movements by means of a coupling member 107 which has a vertical slot 108 at its center through which the stud 90 passes, and which is capable of a limited vertical movement between the depending arms 109 and 110 of the yoke member 111, which is secured at its upper end to the under side of the bed 61 near its center by any suitable means, as by means of the screws 112. The ends of the arms 109 and 110 of the yoke member 111 are connected by a cross bar 113, the same being attached at its ends to the arms by the screws 114. The inner faces 115, 116 of the arms 109 and 110 converge upwardly. Similar faces on the member 107 are adapted to engage the inclined faces 115, 116 with a wedging action as the member 107 is moved upward. It will be seen that when the member 107 is moved downward, a loose connection will be formed between the stud 90 and the bed 61, but when the member 107 is drawn upward so that its inclined faces firmly engage the inclined faces 115, 116, the position of the stud 90 is fixed with reference to the bed 61 in so far as the longitudinal movement of the same is concerned. The stud 90 is free to pass vertically within the slot 108, but is confined by the vertical walls of the slot so that it cannot be moved in a direction lengthwise of the machine. The vertical movement is required because of the action of the link 89 as the driving wheels 84 and 85 are revolved. In order to bring the coupling members 107 and 111 into firm engagement at the proper time, the former is provided with a roller 117 which extends into a cam track 118, which extends lengthwise of the machine and is secured to the central standard 32 at a point near its center, the connection being made in any suitable way, as by the screws 119. The center of the cam track 118 is depressed while its ends are elevated. As the bed is reciprocated, the cam track moves the coupling member 107 downward during the mid-portions of the reciprocating movements and so allows a certain amount of play between the parts. At these times the gear segments 86 and 87 are operating upon the bed to give it its constant speed motion. As the bed moves towards the end of its stroke, the coupling member 107 is raised through the action of the cam track 118 on the roller 117, and in this way the previous loose connection is done away with and the parts are securely held together so as to prevent the stud 90 from having any longitudinal movement relative to the bed. In this way the reversal of the bed is placed directly under the control of the stud 90 upon the link 89. Obviously, as soon as the bed has been retarded, stopped and oppositely accelerated up to the requisite speed, the cam track 118 will cause the coupling member 107 to move downward and thus again restore the loose connection for the mid-portion of the stroke.

Figure 15:
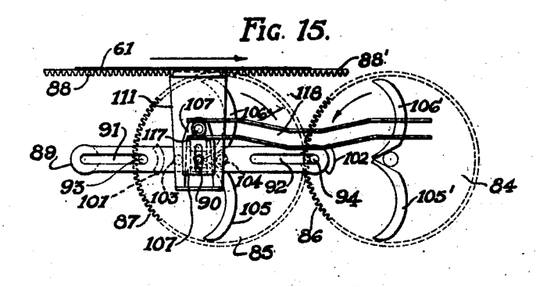
Figs. 15 to 20 inclusive are diagrammatic views illustrating different positions of the mechanism. Throughout these views like characters refer to like parts.
Figure 16:
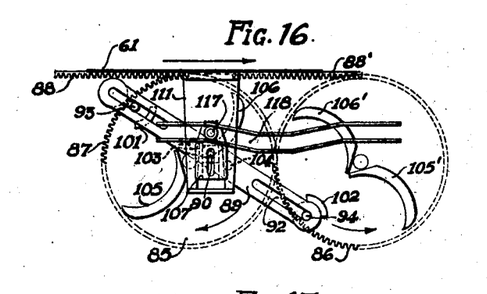
Figure 17:
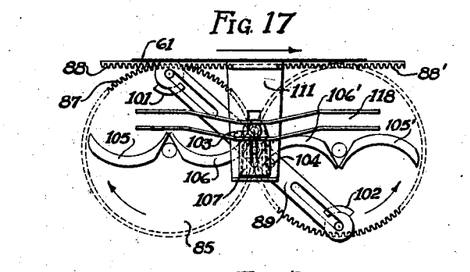
Figure 18:
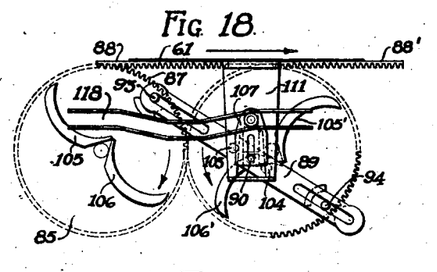
Figure 19:
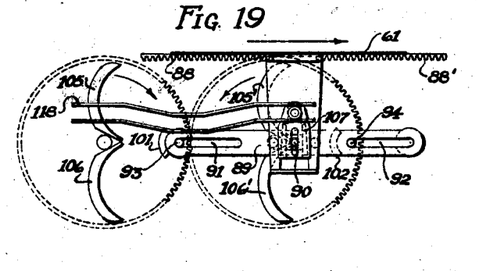
Figure 20:
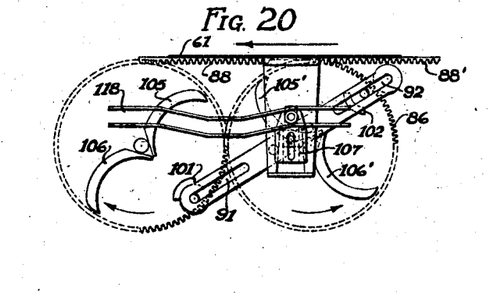

The movement of the bed 61 through the complete cycle will be readily understood from an inspection of Figs. 15 to 20 inclusive. In Fig. 15 the bed 61 is at the extreme left of its stroke, and the coupling members 107 and 111 are firmly seated together. At this time the movement of the bed is under the sole control of the stud 90 upon the link 89, and the latter occupies a horizontal position. Fig. 16 illustrates the bed 61 in the position where the segment 87 upon the driving wheel 85 is at the point of just beginning to drive the bed through its rack 88. The left hand end of the link 89 is moved upward and the right hand end downward, while the stud 90 is moved a short distance to the right. The cam roller 117 is just entering the downward incline of the cam track 118 to gradually loosen the connection between the stud 90 and the bed 61. In passing to this position from the position of Fig. 15, the pin 103 passes into engagement with the adjacent face of the arcuate member 106. The pin 103 and member 106 cooperate with the member 102 and the adjacent shoulder upon the link 89 to hold the link in its proper position under all the strains to which it is subjected. Fig. 17 illustrates the bed in its mid-position. At this time the coupling members 107 and 111 are most loosely connected and the driving of the bed is solely under the control of the segment 87 upon the driving wheel 85. This advance of the bed at a uniform speed continues until the position of Fig. 18 is reached. In this position the segment 87 upon driving wheel 85 is just leaving the rack 88 and the coupling members 107 and 111 have just been brought into tight coupling position. This places the further movement of the bed 61 under the control of the stud 90. In passing from the position of Fig. 17 to that of Fig. 18, the pin 103 upon the link 89 passes out of engagement with the arcuate member 106, and the pin 104 passes into engagement with the arcuate member 106'. These pins, as before noted, cooperate with the members 101 and 102 in maintaining the link in its proper position under the strains to which the same is subjected. Fig. 19 illustrates the bed 61 at the extreme of its movement in one direction. This view is similar to that of Fig. 15, but shows the bed at the opposite limit of its movement. The bed in passing from the position of Fig. 18 to that of Fig. 19 has been solely under the control of the stud 90 upon the link 89. Fig. 20 illustrates the bed 61 on its return movement at the point where it has been accelerated to the peripheral speed of the segment 86 and shows that segment just taking hold of the teeth of the rack 88'. It will be apparent that upon the reverse movement the pins 103 and 104 will cooperate with the arcuate members 106' and 105 in a manner similar to the way in which they cooperated with the members 106 and 105' upon the forward movement of the bed.

The speed of the bed 61 is obviously uniform while it is being driven in one direction by the segment 86 and in the other direction by the segment 87. It will also be obvious that a different retarding and accelerating motion is given to the movement of the stud 90 upon the link 89. This movement is similar to that more fully described in my prior Patent No. 1,063,273, and only differs therefrom by reason of differences in dimensions and variations in design.

The cylinder 62, as before stated, is mounted in the cylinder boxes 63 and 64. These cooperate with springs 121, one only of which is shown, the cranks 122 and 123, and the connecting links 124, in bringing about the cylinder impression in the same manner as fully disclosed in my prior Patent No. 1,225,667, granted May 8, 1917. Because of the disclosure in that patent, it does not seem necessary to further illustrate the manner in which the various parts which contribute to the cylinder impression are actuated.

Figures 2, 3, 4, 5:
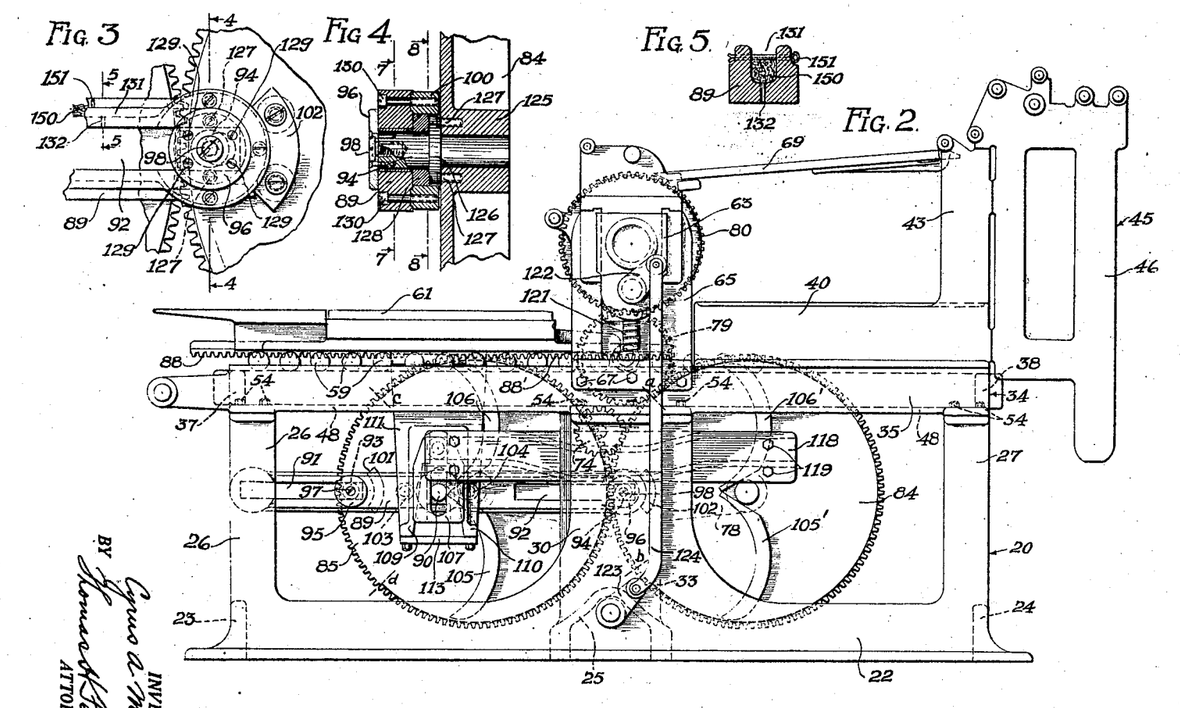
Fig. 2 is a side elevation of the same.
Fig. 3 is an enlarged detail view illustrating the connection of the link with one of the associated driving wheels.
Fig. 4 is a partial section of the same, the plane of section being indicated by the line 4—4 of Fig. 3.
Fig. 5 is a transverse section of a portion of the link showing the way in which the parts are lubricated, the plane of section being indicated by the line 5—5 of Fig. 3.
Figure 6:
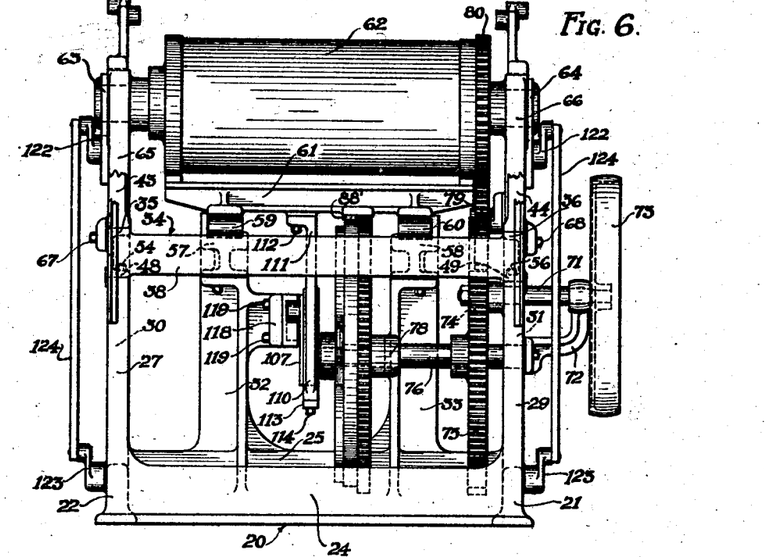
Fig. 6 is an end elevation of the press.
Figure 7:
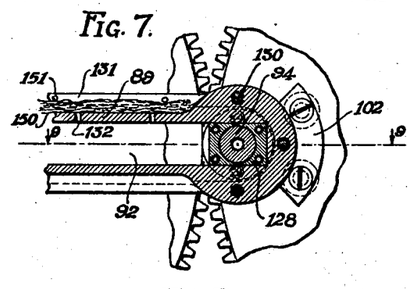
Fig. 7 is a vertical section of the link connection taken on a plane indicated by the line 7—7 of Fig. 4.
Figure 8:
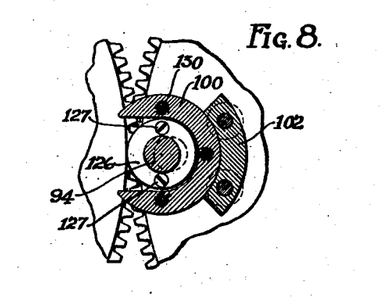
Fig. 8 is a similar section on the line 8—8 of Fig. 4.
Figure 9:
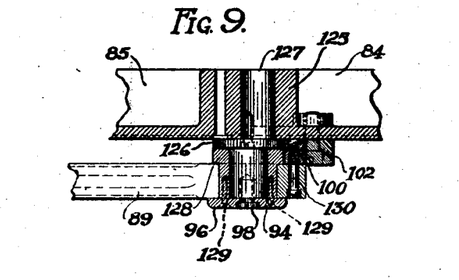
Fig. 9 is a horizontal section taken on the line 9—9 of Fig. 7.
Figure 10:
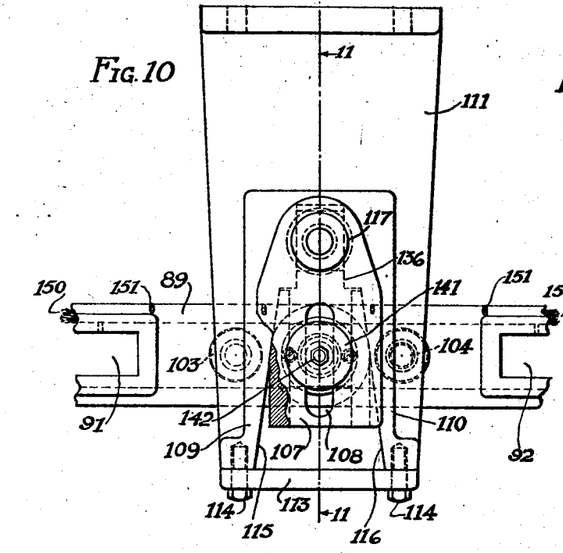
Fig. 10 is an elevation of the mechanism by which the main and auxiliary reciprocating members are connected together and freed from each other for slight independent movement.
Figure 11:
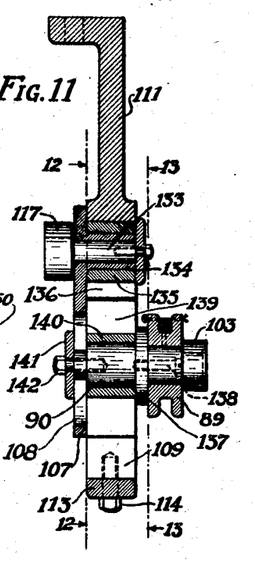
Fig. 11 is a vertical section of the same, the plane of section being indicated by the line 11—11 of Fig. 10.
Figure 12:
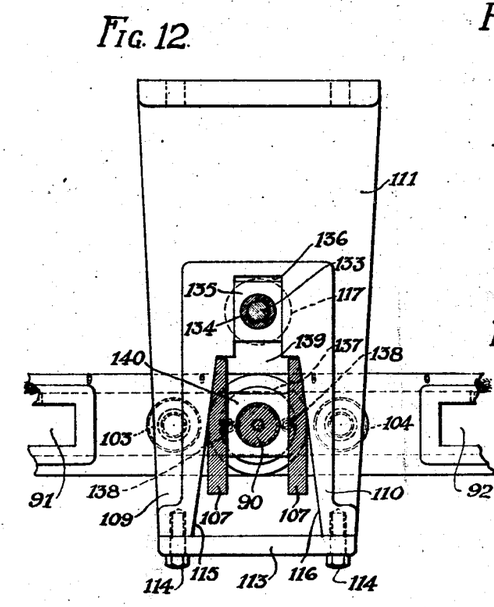
Fig. 12 is a view similar to Fig. 10 but showing certain parts in section as indicated by the line 12—12 of Fig. 11.
Figure 13:
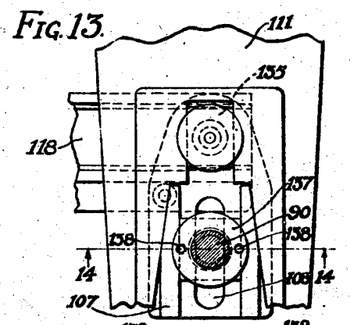
Fig. 13 is a similar view taken from the opposite side, parts being shown in section as indicated by the line 13—13 of Fig. 11.
Figure 14:
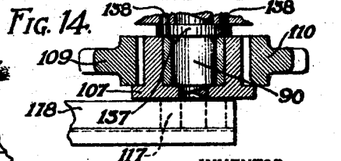
Fig. 14 is a horizontal section of the same taken on a plane indicated by the line 14—14 of Fig. 13.

As shown more particularly in Figs. 3, 4 and 9, the wheel 84 is provided with a boss 125 which is provided with a central aperture for the reception of the pin 94, the central flange 126 on the pin 94 being secured to the web of the wheel 84 by screws 127. The space between the flange 126 and the capping disk 96 is occupied by the link 89 and the box 128. The latter fits over the pin 94 and has an inner circular flange having the same external diameter as the flange 126, and an outer angular portion which just fits within the slot 92 in which it travels to and fro as the machine operates. The cap 96 is firmly secured to the box 128 by screws 129, the fit of the screw 98 within the cap 96 being such that the latter may freely rotate but can not be removed in the direction of the axis of the pin. The space between the cap 96 and the inner flange upon the box 128 is occupied by the link 89. The latter has its shoulder piece 100, or 99 as the case may be, secured in place by screws 130. The upper side of the link 89 is provided with an oiling groove 131 in which an oiling wick 150 may be laid and held in place by some such means as cotter pins 151. Suitable oil holes 132 lead the lubricant to the upper wall of the slot 92 and thence it passes to the box 128 as the latter slides to and fro in the slot. The oil which then passes to the upper side of the box passes over its ends and down on to the lower wall of the slot 92 and is there applied to the under side of the box 128. The details shown in these figures are those of pin 94. It will be understood that the details of pin 93 and its connections to the link and its wheel 85 are similar.

By way of further explanation of the structure of Figs. 10 to 14 inclusive, it should be noted that the cam wheel 117 is carried at the forward end of a short shaft 133, which is journaled in a tubular extension 134 projecting rearwardly from the upper portion of the coupling member 107. A box 135 fits over the extension 134 and is provided with parallel vertical sides which move up and down upon the walls of the vertical slot 136 as the member 107 is raised and lowered.

The stud pin 90 extends into an aperture in the link 89 and at the forward side of the link has a flange 137. Screw bolts 138 pass through holes in the link into threaded engagement with tapped holes through the flange 137. In this way the pin is firmly secured to the link 89. The flange 137 is of greater diameter than the width of the slot or space 139 in the yoke or coupling member 107 just forward of it and consequently the flange 137 keeps the pin 90 from passing further forward and thus keeps the link 84 spaced from the coupling members 107 and 111. The portion of the pin 90 just forward of the flange 137 is enclosed in a box 140. This box is apertured to closely fit the enclosed portion of the pin and its vertical walls are flat and parallel and, as the parts move relative to each other, these flat walls ride upon the flat faces of the walls of the slot 139. It will be noted too that the reduced portion of the pin 90 which engages the box 140 is of greater diameter than the width of the slot 108 in the coupling member 107. Consequently this portion of the pin 90 cannot pass through the slot and the member 107 is accurately positioned by engaging the adjacent shoulder on the pin while of course still being free to move relative to the pin. The forward end of the pin 90 is reduced in diameter so that it will just nicely fit the slot 108 of member 107. A cap 141 is secured to the end of the pin 90 by a screw bolt 142 and the member 107 is thereby held up against the adjacent shoulder on the pin but not so as to bind the parts but so as to leave the member 107 free to move up and down relative to the pin 90.

Figure 1:
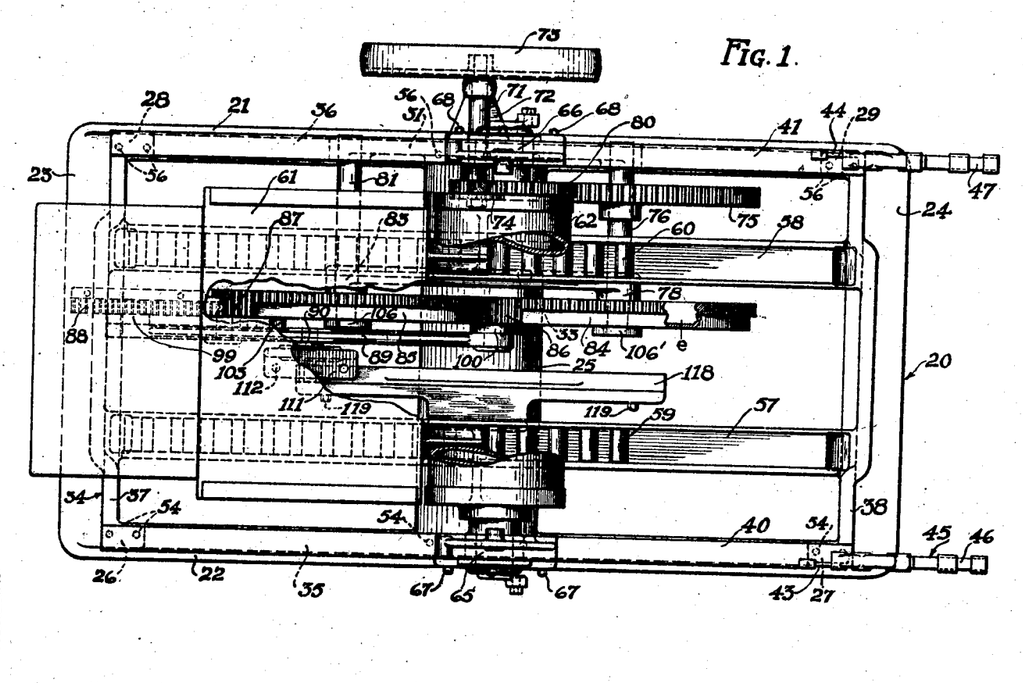
Fig. 1 is a plan view of a printing press having reciprocating mechanism constructed and arranged according to the present invention.

It will be noted that the printing stroke occurs at the time the bed passes from the position of Fig. 16 to that of Fig. 18. It is produced by gear segment 87 driving the bed through rack 88. The extent of the segments 86 and 87 is marked off in Fig. 2 by the indicating lines *a* and *b* in the case of segment 86 and *c* and *d* in the case of segment 87, the extent not being very clearly indicated by the structure as viewed in that figure. The structure of the wheels 84 and 85 is also indicated by breaking away a portion of the wheel 84 at the point *e* in Fig. 1. These wheels have central bosses which are bored out to fit their shafts and are also provided with peripheral bosses at the points where the pins 93 and 94 are secured as shown more particularly in Figs. 4 and 9.

Obviously many of the details herein disclosed may be varied without departing from the spirit and scope of the invention. Therefore, I aim to cover by the terms of the appended claims all such alterations and modifications as rightly come within the spirit and scope of my invention.

What I claim as new and desire to secure by a patent of the United States is:

1. The combination of two reciprocating members movable in approximately parallel paths through equal distances, means for driving the first reciprocating member through the mid-portions of its to and fro movements at a uniform speed, and means loosely connecting said reciprocating members together while said first reciprocating member is being driven at said uniform speed and operative to firmly secure said reciprocating members against relative longitudinal movement as said members approach the ends of their to and fro movements to place the retardation, stoppage and acceleration of the first reciprocating member up to said uniform speed under the control of the second reciprocating member.

2. The combination of two reciprocating members movable in approximately parallel paths through equal distances, means for driving the first reciprocating member through the mid-portions of its to and fro movements at a uniform speed, a coupling member rigidly fixed to one of said reciprocating members and extending into proximity to the other at all times, a second coupling member cooperating with said first coupling member to firmly hold said reciprocating members together against relative longitudinal movement, and means for moving said second coupling member into and out of holding position with said first coupling member as said reciprocating members pass respectively into and out of the end portions of their to and fro movements.

3. The combination of two reciprocating members movable in approximately parallel paths through equal distances, means for driving the first reciprocating member through the mid-portions of its to and fro movements at a uniform speed, a yoke rigidly connected to one of said members and at all times embracing the other, a member for centering said second reciprocating member within said yoke, and a cam for shifting said centering member to centering position as said reciprocating members approach the ends of their reciprocating movements.

4. The combination of a reciprocating member having two racks, intermeshing gear wheels rotatable about fixed axes, each said wheel having a segment for engaging one of said racks to drive said reciprocating member through the mid portion of its movement, one wheel in one direction and the other in the opposite direction, a stud, means actuated by said gear wheels to drive said stud to and fro in a path approximately parallel to and coextensive with that of said reciprocating member, and means loosely connecting said reciprocating member to said stud while the reciprocating member is being driven by said segments and operative to firmly secure said reciprocating member and stud against relative longitudinal movement as said reciprocating member and stud approach the ends of their reciprocations to place the retardation, stoppage and acceleration of the reciprocating member under the control of said stud.

5. The combination of a reciprocating member having two racks, intermeshing gear wheels rotatable about fixed axes, each said wheel having a segment for engaging one of said racks to drive said reciprocating member through the mid portion of its movement, one wheel in one direction and the other in the opposite direction, a stud, means actuated by said gear wheels to drive said stud to and fro in a path approximately parallel to and coextensive with that of said reciprocating member, a coupling member rigidly secured to said reciprocating member and extending into proximity to said stud at all times, a second coupling member cooperating with said first coupling member to firmly hold said stud and reciprocating member together against relative longitudinal movement, and means for moving said second coupling member into and out of holding position with said first coupling member as said reciprocating member and stud pass respectively into and out of the end portions of their to and fro movements.

6. The combination of a reciprocating member having two racks, intermeshing gear wheels rotatable about fixed axes, each said wheel having a segment for engaging one of said racks to drive said reciprocating member through the mid portion of its movement, one wheel in one direction and the other wheel in the opposite direction, a stud, means actuated by said gear wheels to drive said stud to and fro in a path approximately parallel to and coextensive with that of said reciprocating member, a yoke rigidly connected to said reciprocating member and at all times embracing said stud, a member for centering said stud within said yoke, and a cam for shifting said centering member to centering position as said reciprocating member and stud approach the ends of their reciprocating movements.

7. The combination of a driven reciprocating member, a driving reciprocating member movable in a path approximately parallel to the path of travel of said driven member, means connecting said members at all times, loosely during the mid portions of their reciprocations, and tightly, as to relative longitudinal movement, during the end portions of their reciprocations, and means for giving said driven member a movement during the mid portions of its reciprocations different from that of said driving member during the same mid portions.

8. The combination of a driven reciprocating member, a driving reciprocating member movable in a path approximately parallel to that of said driven member, a coupling member rigidly fixed to one of said reciprocating members and extending into proximity to the other at all tmes, a second coupling member cooperating with said first coupling member to firmly hold said reciprocating members together against relative longitudinal movement, means for moving said second coupling member into and out of holding position with said first coupling member as said reciprocating members pass respectively into and out of the end portions of their reciprocations, and means for giving said driven member a movement during the mid portions of its reciprocations different from that of said driving member during the same mid portions.

9. The combination of a driven reciprocating member, a driving reciprocating member movable in a path approximately parallel to that of said driven member, a yoke rigidly connected to one of said members and at all times embracing the other, a member for centering said other reciprocating member within said yoke, a cam for shifting said centering member to centering position as said reciprocating members approach the ends of their reciprocating movements, and means for giving said driven member a movement during the mid portions of its reciprocations different from that of said driving member during the same mid portions.

10. The combination of a reciprocating member, a stud, two oppositely driven wheels, means actuated by said wheels to drive said stud to and fro in a path approximately parallel to that of said reciprocating member, means connecting said reciprocating member and stud together at all times, loosely during the mid portions of their reciprocations and tightly, as to relative longitudinal movement, during the end portions of their reciprocations, and means for giving said reciprocating member a movement during the mid portions of its reciprocations different from that of said stud during the same mid portions.

11. The combination of a reciprocating member, a stud, two oppositely driven wheels, means actuated by said wheels to drive said stud to and fro in a path approximately parallel to that of said reciprocating member, a coupling member rigidly fixed to said reciprocating member and extending into proximity to said stud at all times, a second coupling member cooperating with said first coupling member to firmly hold said reciprocating member and stud together against relative longitudinal movement, means for moving said second coupling member into and out of holding position with said first coupling member as said reciprocating member and stud pass respectively into and out of the end portions of their reciprocations, and means for giving said reciprocating member a movement during mid portions of its reciprocations different from that of said stud during the same mid portions.

12. The combination of a reciprocating member, a stud, two oppositely driven wheels, means actuated by said wheels to drive said stud to and fro in a path approximately parallel to that of said reciprocating member, a yoke rigidly connected to said reciprocating member and at all times embracing said stud, a member for centering said stud within said yoke, a cam for shifting said centering member to centering position as said reciprocating member and stud approach the ends of their reciprocations, and means for giving said reciprocating member a movement during mid portions of its reciprocations different from that of said stud during the same mid portions.

13. The combination of a pair of oppositely rotating intermeshing gear wheels, crank pins on said wheels, a link having slotted connection with said pins and positioned so as to extend past the point of engagement between said wheels in all positions of the parts, a stud at the center of said link, a reciprocating member having a longitudinal travel equal to that of said stud, and coupling means for operatively connecting said stud to said reciprocating member.

14. The combination of a pair of oppositely rotatable intermeshing gear wheels, crank pins on said wheels, a link having slotted connection with said pins and positioned so as to extend past the point of engagement of said wheels in all positions of the parts, shoulder pieces at the ends of the link and arcuate projections on said wheels cooperating to prevent sliding of said link upon said pins in certain positions of the parts, pins upon said link on opposite sides of its center and a pair of arcuate members on each of said wheels extending from near the wheel's center to near its periphery and likewise cooperating to prevent sliding of the link under unusual circumstances, a reciprocating member, and coupling means for uniting said reciprocating member to said link to give the latter control over the movements of the former.

15. The combination of a pair of oppositely rotating intermeshing gear wheels, crank pins on said wheels, a link having slotted connection with said pins and positioned to pass the point of engagement between said wheels in all portions of the parts, a stud at the center of said link, a reciprocating member, and a connection between said reciprocating member and stud in all positions of the parts.

16. The combination with a printing press frame, of a reciprocating bed at the usual height, centrally disposed racks on the under side of said bed near its transverse center, two shafts journaled in said frame, intermeshing gear wheels on said shafts extending almost the aforesaid height, a toothed segment on one quarter of the periphery of each of said wheels in addition to the intermeshing teeth, said segments operating to engage said racks respectively to drive said bed during mid portions of its to and fro movements, crank pins on said wheels, a link having slotted connection at its ends with said pins, coupling members always connecting said bed to the center of said link, loosely when said segments are in mesh with said racks and at other times tightly as to relative longitudinal movement, and a cam on said frame beneath said bed operative to shift said coupling members to establish said loose and tight connections.

In witness whereof, I hereunto subscribe my name this 21st day of May, 1924.

CYRUS A. McCAIN.